US012531772B2

(12) United States Patent
Kancharla et al.

(10) Patent No.: US 12,531,772 B2
(45) Date of Patent: Jan. 20, 2026

(54) TECHNIQUES FOR MONITORING NODE STATUS USING A THROUGHPUT METRIC (71) Applicant: Microsoft Technology Licensing, LLC, Redmond, WA (US)

(72) Inventors: Vamshi Krishna Kancharla, Hyderabad (IN); Edet Edet Nkposong, Mercer Island, WA (US); Murat Acikgoz, Kirkland, WA (US); Hrishit Harshadbhai Patel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 770 days.

(21) Appl. No.: 17/809,514

(22) Filed: Jun. 28, 2022

(65) Prior Publication Data

US 2023/0421429 A1 Dec. 28, 2023

(51) Int. Cl.
H04W 4/00 (2018.01)
H04L 41/0631 (2022.01)
H04L 43/0888 (2022.01)

(52) U.S. Cl.
CPC ...... H04L 41/0631 (2013.01); H04L 43/0888 (2013.01)

(58) Field of Classification Search
CPC .................................................. H04L 43/0888
See application file for complete search history.

(56) References Cited

U.S. PATENT DOCUMENTS

| | | | |
|---|---|---|---|
| 9,584,407 B2 | 2/2017 | Martin et al. | |
| 10,148,570 B2 | 12/2018 | Shalev et al. | |
| 10,924,350 B1* | 2/2021 | Kaminski | G06F 11/301 |
| 11,115,504 B2 | 9/2021 | Balasubramanian et al. | |
| 2005/0243722 A1* | 11/2005 | Liu | H04L 47/15 370/235 |
| 2014/0047342 A1 | 2/2014 | Breternitz et al. | |
| 2014/0089489 A1* | 3/2014 | Duvnjak | H04L 41/0681 709/224 |
| 2016/0105715 A1* | 4/2016 | Panje | H04N 21/4424 725/14 |
| 2017/0280342 A1* | 9/2017 | Sugiyama | H04W 24/08 |

(Continued)

FOREIGN PATENT DOCUMENTS

| | | |
|---|---|---|
| EP | 2920917 A2 | 9/2015 |
| EP | 2429119 B1 | 8/2018 |
| EP | 3847781 A1 | 7/2021 |

OTHER PUBLICATIONS

"International Search Report and Written Opinion issued in PCT Application No. PCT/US2023/022619", Mailed Date: Oct. 9, 2023, 12 Pages.

(Continued)

Primary Examiner — Elisabeth Benoit Magloire
(74) Attorney, Agent, or Firm — ArentFox Schiff LLP (57) ABSTRACT Described are examples for detecting possible failure in network nodes by monitoring, by a monitoring application, a data throughput for at least one of data sent or received at a network node over a time period, detecting a possible failure of the network node based on comparing the data throughput to an average data throughput for the network node measured over one or more historical time periods of a similar duration as the time period, and/or reporting the possible failure of the network node.

24 Claims, 4 Drawing Sheets (56) References Cited

U.S. PATENT DOCUMENTS

| | | | |
|---|---|---|---|
| 2020/0177485 A1 | 6/2020 | Shurtleff et al. | |
| 2020/0322242 A1 | 10/2020 | Malysh et al. | |
| 2021/0075797 A1* | 3/2021 | Gan | G06F 9/5077 |
| 2022/0021697 A1* | 1/2022 | Adamson | H04L 63/20 |
| 2022/0038934 A1* | 2/2022 | Kumar | H04W 24/10 |
| 2023/0035310 A1* | 2/2023 | Denneman | G06N 3/084 |

OTHER PUBLICATIONS

Cobb, et al., "Network-Related Performance Counters", Retrieved From: https://docs.microsoft.com/en-us/windows-server/networking/technologies/network-subsystem/net-sub-performance counters#bkmk_np, Oct. 27, 2021, 5 Pages.

Peng, et al., "Network Measurement and Performance Analysis at Server Side", In Journal of Future Internet, vol. 10, Issue 7, Jul. 16, 2018, 18 Pages.

* cited by examiner

TECHNIQUES FOR MONITORING NODE STATUS USING A THROUGHPUT METRIC

BACKGROUND

Cloud-based computing platforms are provided where applications can execute, access storage, control or receive input from devices, etc. over multiple distributed network nodes. The network nodes are connected to one another via one or more network connections that may include the Internet. Applications can be redundantly provided across the cloud-based computing platform, or can otherwise provide services using multiple network nodes to allow concurrent access by many users or associated client devices. Indeed, some corporations provide public cloud-based computing platform access to entities as desired to facilitate cloud-based deployment of applications. The public cloud-based computing platforms, for example, may include a complex or vast architecture of nodes including data centers across a country or globe, where each data center has many network nodes connected via various network architectural nodes, such as switches. For example, various racks of network nodes can be provided where each rack can have a switch to connect the network nodes, and multiple racks can be connected to one another by a higher-layer switch and so on. The data centers can also be connected by one or more switches, etc. The complex or vast architecture of the various network nodes can present challenges in detecting failures in cloud-based computing platforms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for detecting possible failure in network nodes is provided that includes monitoring, by a monitoring application, a data throughput for at least one of data sent or received at a network node over a time period, detecting a possible failure of the network node based on comparing the data throughput to an average data throughput for the network node measured over one or more historical time periods of a similar duration as the time period, and reporting the possible failure of the network node.

In another example, a device for detecting possible failure in network nodes is provided that includes a memory storing instructions, and at least one processor coupled to the memory. The at least one processor is configured to execute the instructions to monitor, by a monitoring application, a data throughput for at least one of data sent or received at a network node over a time period, detect a possible failure of the network node based on comparing the data throughput to an average data throughput for the network node measured over one or more historical time periods of a similar duration as the time period, and report the possible failure of the network node.

In another example, a computer-readable device is provided that stores instructions thereon that, when executed by at least one computing device, causes the at least one computing device to perform operations for detecting possible failure in network nodes. The operations include monitoring, by a monitoring application, a data throughput for at least one of data sent or received at a network node over a time period, detecting a possible failure of the network node based on comparing the data throughput to an average data throughput for the network node measured over one or more historical time periods of a similar duration as the time period, and reporting the possible failure of the network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to monitoring network nodes of a cloud-based computing platform for possible failure, which may include using a throughput metric. For example, packet (or other data) drops on a particular network node (e.g., a particular host) can be a relatively common scenario due to connectivity loss. Connectivity loss can be caused by various incidents, such as cable connectivity issues, switch or router issues, issues in operating system layer, or other issues in network stack at internet protocol (IP) layer, transmission control protocol (TCP)/IP layer, user datagram protocol (UDP) layer, etc. of the network node. As such, in an example, data throughput metrics observed over a time period may allow for identification of a possible issue at the network node.

For example, a data throughput of data sent or received at a network node can be monitored over a time period and compared to one or more historical values of data throughput at the network node for a similar time period. A deviation in data throughput may indicate a possible issue with the network node (or with another network node). In addition, based on a configured network architecture, a deviation in data throughput for multiple nodes may indicate a possible issue with another network node, such as a switch that connects the multiple nodes. In another example, resource allocation or other information can be considered in detecting the possible issue. For example, if a virtual machine (VM) is added or removed from the network node, this may cause the deviation in throughput, and it may not be the possible issue. Moreover, for example, the average data throughput, to which measured data throughput is compared to detect the possible issue, can be modified where VMs are added or removed from the network node. In any case, possible issues can be reported to an administrator or system to facilitate manual or automated mitigation thereof.

Using the data throughput to detect deviation in this regard can allow for identifying issues at various layers within a cloud-based computing platform, such as at the network node, a cable or other connection medium at the network node, a switch, multiplexing (MUX)/demultiplexing (DeMUX) logic at the switch, top of rack (Tor), T1 switch, T2 switch, T3 switch, etc. This can ease detection of the issue and notification to the appropriate stakeholder of the node and/or appropriate mitigation of the issue without having to manually investigate each node for the possible issue.

Figure 1:
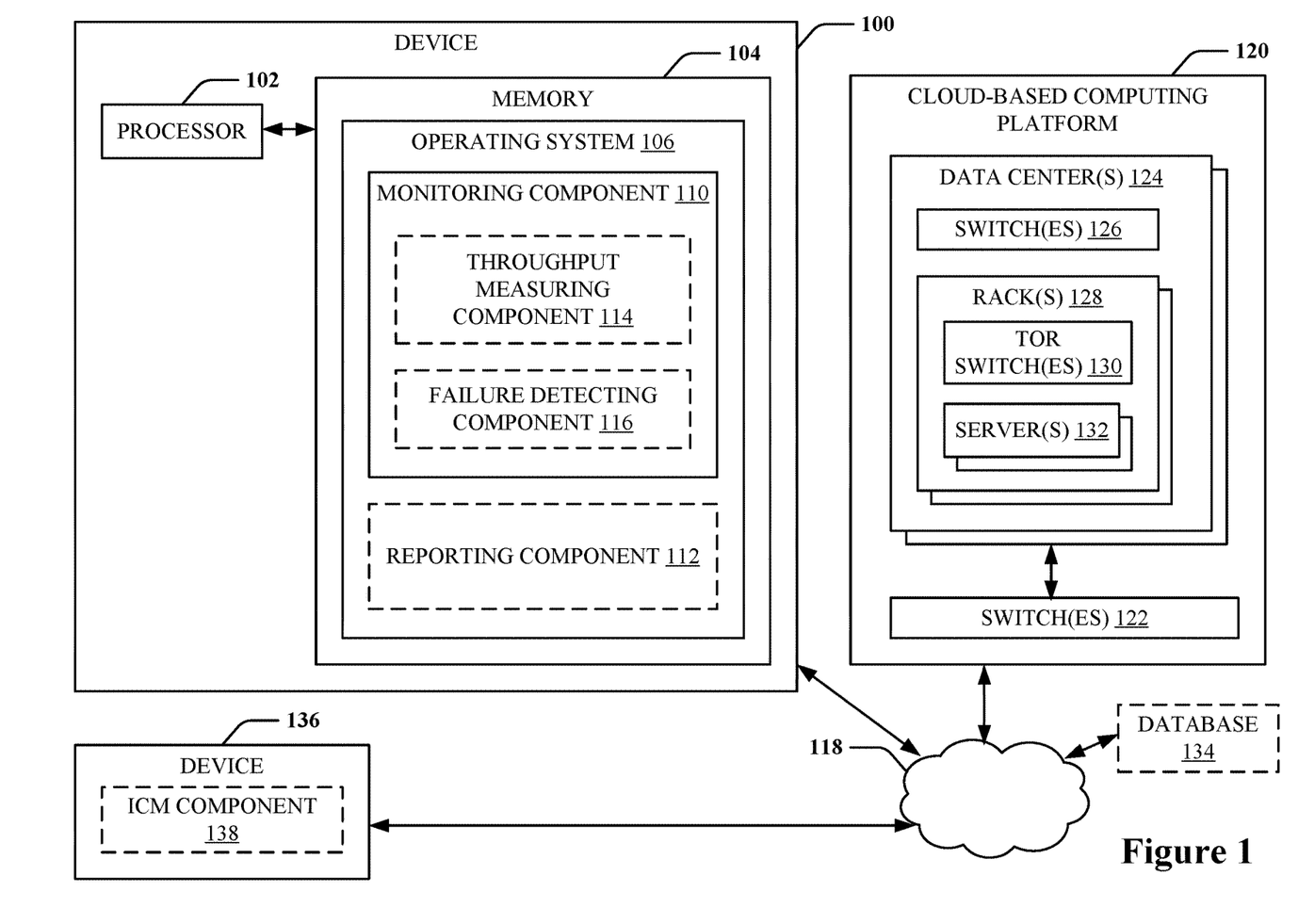
FIG. 1 is a schematic diagram of an example of a device for performing functions related to monitoring network nodes of a cloud-based computing platform for possible failure, in accordance with aspects described herein.
Figure 2:
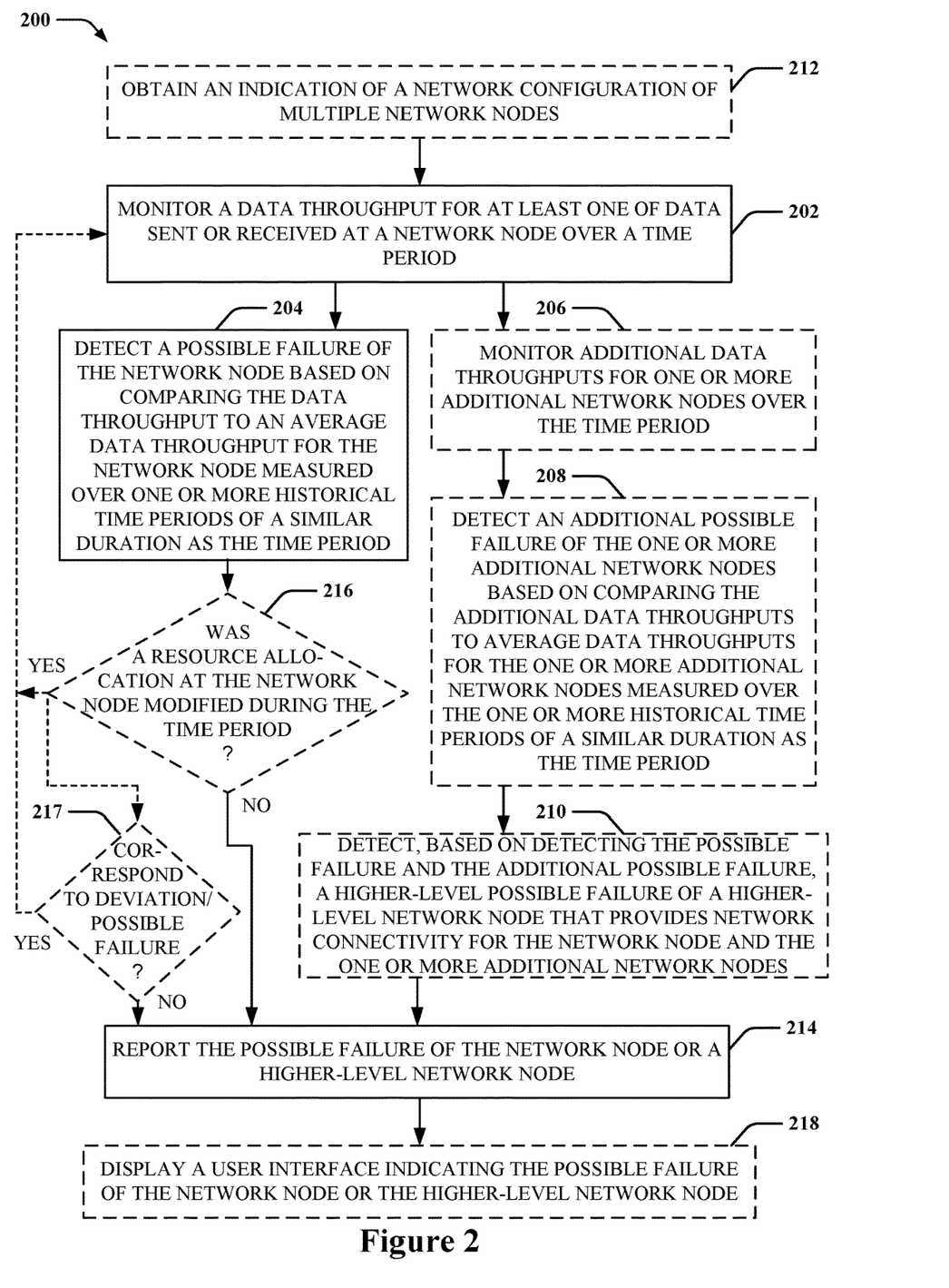
FIG. 2 is a flow diagram of an example of a method for monitoring throughput of one or more network nodes in a cloud-based computing platform, in accordance with aspects described herein.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) for performing functions related to monitoring network nodes of a cloud-based computing platform for possible failure. In an example, device 100 can include a processor 102 and/or memory 104 configured to execute or store instructions or other parameters related to providing an operating system 106, which can execute one or more applications or processes, such as, but not limited to, a monitoring component 110 for monitoring throughput at one or more network nodes of a cloud-based computing platform for possible failure, and/or a reporting component 112 for reporting detected possible failures for mitigation thereof. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

For example, monitoring component 110 can include a throughput measuring component 114 that can measure throughput related to at least one of sending or receiving data at one or more network nodes, and/or a failure detecting component 116 that can detect a possible failure at the one or more network nodes based on the measured throughput. In one example, throughput measuring component 114 can measure the throughput in real time, such that the throughput measuring component 114 or a related service can service principal authorization (e.g., access control list (ACL) authorization) on to the network nodes targeted for monitoring and can execute a shell command retrieve performance metrics, such as throughput, in real time. In another example, throughput measuring component 114 can measure the throughput at a delay, such by using throughput metrics stored for later consumption. For example, an application can be deployed on the network nodes targeted for monitoring, which can collect the throughput metrics on a periodic basis and store the data in a database. In this example, throughput measuring component 114 can retrieve the throughput data from the database. In this regard, for example, device 100 can communicate with the cloud-based computing platform 120, or one or more components there of (e.g., switches, services, etc.), database 134, or device 136 via one or more networks 118.

In an example, a cloud-based computing platform 120 can include one or more switch(es) 122 that can communicatively couple one or more data centers 124. Each data center 124 can have one or more switch(es) 126 that can communicatively couple one or more racks 128. Each rack 128 can have one or more top-of-rack ("Tor") switch(es) 130 that can communicatively couple one or more servers 132, etc. In one example, each switch 126 can be a T2 switch, each switch 122 can be a T1 switch, etc. For example, failure can be possible at substantially any of the network nodes—e.g., the server(s) 132, Tor switch(es) 130, rack(s) 128, switch(es) 126, switch(es) 122, etc., and the monitoring component 110 can monitor throughput at various network nodes (e.g., or the server(s) 132) to detect possible failure of the various network nodes. In one example, as described, monitoring component 110 can communicate with the network nodes (e.g., or at least the server(s) 132) of the cloud-based computing platform 120 to receive throughput metrics in real time. In another example, as described, network nodes (e.g., or at least the server(s) 132) of the cloud-based computing platform 120 can provide throughput metrics to a database 134, which the monitoring component 110 can access to detect possible failure in one or more of the network nodes.

In an example, reporting component 112 can report detected possible failures to an administrator or stakeholder of the network node for which the failure is detected. For example, reporting component 112 can report detected possible failures to an intelligent contact management (ICM) component 138 of another device 136, which can provide notification or can otherwise trigger remediation of the possible failure. For instance, the ICM component 138 can report the possible failure or a related notification to a network administrator or to an automated failure repair mechanism that can replace or activate redundant network nodes to mitigate decrease in throughput caused by the possible failure. In one example, ICM component 138 or another component of another device can provide load balancing or traffic redirection, initialization or instantiation of another VM or server 132 (or other network node), etc. in an attempt to provide a backup network node to at least temporarily mitigate the detected failure of another network node. In another example, ICM component 138 can determine a correlation to create an actual notification and/or a remediation and/or mitigation of the issue. For instance, ICM component 138 can identify each failure and map each failure to a remediation action, which may include instantiating an automated failure repair mechanism (e.g., a software robot) to effect a repair according to the remediation action. In any case, aspects described herein provide for automated detection of possible failure in network nodes, which can improve delay and search time that may otherwise be needed to locate failed network nodes in a complex or voluminous cloud-based computing platform architecture.

FIG. 2 is a flowchart of an example of a method 200 for monitoring throughput of one or more network nodes in a cloud-based computing platform. For example, method 200 can be performed by a device 100 and/or one or more components thereof to facilitate monitoring of network nodes in a cloud-based computing platform 120.

In method 200, at action 202, a data throughput for at least one of data sent or received at a network node can be monitored over a period of time. In an example, throughput measuring component 114 of a monitoring component 110, e.g., in conjunction with processor 102, memory 104, operating system 106, etc., can monitor the data throughput for at least one of data sent or received at the network node over the period of time. For example, throughput measuring component 114 can communicate with the network nodes of the cloud-based computing platform 120 (e.g., at least servers 132, but possibly also Tor switch(es) 130, switch(es) 126, switch(es) 122, etc.) to obtain associated throughput metrics, or may access a database 134 to which the network nodes can communicate throughput metrics.

In an example, the throughput metrics can include network stack metrics, such as data packets sent or received over a period of time. In one example, throughput can be measured as determining packet drops before reaching a targeted network node. For example, for packet drops before reaching the targeted node, for IPv4/IPv6, the throughput metrics can include datagrams received per second or datagrams sent per second. For example, for packet drops before reaching the targeted node, for TCPv4/TCPv6, the throughput metrics can include segments received per second, segments sent per second, or segments retransmitted per second. In another example, throughput can be measured as determining issues after reaching the targeted node. For example, for issues after reaching the targeted node, for network interface or adapter issues, the throughput metrics can include packets received discarded, packets received errors, packets output discarded or packets output errors. For example, for issues after reaching the targeted node, for a filtering protocol, the throughput metrics can include packets discarded per second. For example, for issues after reaching the targeted node, for UDPv4/UDPv6, the throughput metrics can include datagrams received errors. For example, for issues after reaching the targeted node, for TCPv4/TCPv6, the throughput metrics can include connection failures or connections reset. For example, for issues after reaching the targeted node, for network quality of service (QoS) policy, the throughput metrics can include packets dropped or packets dropped per second.

In an example, throughput measuring component 114 can measure the throughput at a given network node based on the throughput metrics received for the network node over a time period. For example, throughput measuring component 114 can measure the throughput (e.g., one or more of the above throughput metrics) at the given network node over one or more historical time periods of a similar duration. Throughput measuring component 114, in an example, can average the throughput metrics for the network node over the one or more historical time periods. In an example, the throughput measuring component 114 can store the average metrics for a network node in memory 104 or in another database or storage for subsequent use in detecting possible failure of the network node. For example, the one or more historical time periods can include a day for computing daily average throughput for the network node, an hour for computing hourly average throughput for the network node (which may vary per hour throughout the day), or substantially any time period.

In addition, for example, throughput measuring component 114 can measure the throughput metric of the network node for a current (or evaluation) time period, and can compare the measured throughput metric to one or more stored historical averages for the throughput metric at the network node. A deviation in the current (or evaluated) throughput metric may indicate possible failure of the network node. For example, a drop in throughput may indicate a possible issue with the network node, or a surge in throughput may help to identify a possible issue with a different network node (and traffic being offloaded from the different network node to the network node).

In method 200, at action 204, a possible failure of the network node can be detected based on comparing the data throughput to an average data throughput for the network node measured over one or more historical time periods of a similar duration as the time period. In an example, failure detecting component 116 of a monitoring component 110, e.g., in conjunction with processor 102, memory 104, operating system 106, etc., can detect the possible failure of the network node based on comparing the data throughput to an average data throughput for the network node measured over the one or more historical time periods of similar duration as the time period. For example, failure detecting component 116 can detect possible failure of the network node (or of another network node) where comparing the data throughput to the average data throughput (e.g., via subtraction) results in a deviation that achieves a threshold.

For example, for a given network node (e.g., at least one of server(s) 132), throughput measuring component 114 can retrieve one or more of the example throughput metrics (e.g., network stack metrics), described in various examples above, for a certain duration of a time period (e.g., a last preconfigured interval, such as daily, hourly, etc.). In this example, failure detecting component 116 can compare the measured throughput metrics against the stored averages for the same configured duration of the time period (e.g., one or more previous intervals, such as one or more previous days, one or more previous hours, etc.) to detect possible failure. In a specific example, throughput measuring component 114 can measure packet drops per second over an hour, and failure detecting component 116 can compare the packet drops per second over the hour to an average of packet drops per second for the network node over multiple previous hours. In any case, failure detecting component 116 can detect possible failure of the node based on a deviation detected for the throughput metric as measured and compared to the historical average.

In an example, a deviation in data throughput, such as a larger number of packet drops than average, can indicate a connectivity issue in a corresponding network node. A surge in packet throughput may indicate a fail over scenario for the network node, or a potential new service provisioning, which may enable further implementation related to latest deployment checks in determining whether a possible failure is occurring. In another example, a deviation in data throughput, such as a larger number of packet drops than average, in multiple network nodes of a rack may indicate a possible issue with the Tor switch (T1 Switch) connectivity. A deviation in multiple racks may indicate a possible issue with the T2 Switch (e.g., a Row Switch) connectivity, etc. In addition, though aspects are generally described herein as related to servers connected to the switches, racks, etc., the network nodes may also include other network nodes such as printers, optical devices, storage devices, etc., and the throughput metrics for such nodes can be similar tracked for detecting potential issues.

In method 200, optionally at action 206, additional data throughputs for one or more additional network nodes can be monitored over the time period. In an example, throughput measuring component 114 of a monitoring component 110, e.g., in conjunction with processor 102, memory 104, operating system 106, etc., can monitor additional data throughputs for the one or more additional network nodes over the time period. For example, throughput measuring component 114, as described, can measure and store average throughput metrics for multiple network nodes, and/or can monitor the throughput metrics for the multiple networks nodes over the time period to detect possible deviation of the throughput. For example, throughput measuring component 114 can continually monitor the data throughput metrics of multiple or all servers (or other nodes, such as printers, optical devices, etc.) in the cloud-based computing platform 120, the various switches, and/or the like. For example, monitoring component 110 can include a multi-threaded application that loads all the targeted hosts (e.g., network nodes) and runs the monitoring algorithm, via throughput measuring component 116, on a periodic manner through a scheduler to obtain and compare data throughput metrics, as described.

In method 200, optionally at action 208, an additional possible failure of the one or more additional network nodes can be detected based on comparing the additional data throughputs to average data throughputs for the one or more additional network nodes measured over the one or more historical time periods of the similar duration as the time period. In an example, failure detecting component 116 of a monitoring component 110, e.g., in conjunction with processor 102, memory 104, operating system 106, etc., can detect the additional possible failure of the one or more additional network nodes based on comparing the additional data throughputs to average data throughputs for the one or more additional network nodes measured over the one or more historical time periods of the similar duration as the time period. In an example, failure detecting component 116 can detect the possible failure of the one or more addition network nodes as similarly described for the network node in relation to action 204 above. In an example, detecting a potential issue with the network node and the one or more additional network nodes may indicate a possible failure of a higher-level node that may be associated with the network node and the one or more additional network nodes. For example, the configuration can indicate the higher-level node as an upstream node of the network node.

In method 200, optionally at action 210, a higher-level possible failure of a higher-level network node that provide connectivity for the network node and the one or more additional network nodes can be detected based on detecting the possible failure and the additional possible failure. In an example, failure detecting component 116 of a monitoring component 110, e.g., in conjunction with processor 102, memory 104, operating system 106, etc., can detect, based on detecting the possible failure and the additional possible failure, the higher-level possible failure of the higher-level network node that provides network connectivity for the network node and the one or more additional network nodes. For example, where the network node and the one or more additional network nodes for which possible failure is detected (e.g., which are detected as having a similar throughput metric achieving a threshold) have a common higher-level node, this can indicate a possible issue with the higher-level node.

For example, where multiple servers 132 that connect to a Tor switch 130 have the same possible issue detected, this may indicate a possible issue with the Tor switch 130, and failure detecting component 116 can accordingly detect the possible issue with the Tor switch 130. Similarly, where failure detecting component 116 detects possible failure of multiple Tor switches 130 (or servers 132 associated with each of the Tor switches 130), this may indicate an issue with the rack 128. Similarly, where failure detecting component 116 detects possible failure of multiple racks 128 (or servers 132 associated with each of the racks 128), this may indicate an issue with the switch(es) 126, and so on for data centers 124, switch(es) 122, etc. In one example, detecting the source of the possible failure in this regard can be based on a network configuration or architecture of the cloud-based computing platform.

In method 200, optionally at action 212, an indication of a network configuration of multiple network nodes can be obtained. In an example, failure detecting component 116 of a monitoring component 110, e.g., in conjunction with processor 102, memory 104, operating system 106, etc., can obtain the indication of the network configuration of the multiple network nodes, which can assist in detecting possible failure at higher levels. For example, the indication can specify the architecture of the cloud-based computing platform 120 that is to be monitored for possible failures. For example, the indication can indicate a hierarchical structure of the multiple network nodes, which may include a top level cloud-based computing platform entity or stakeholder, a list of continents having associated data centers, a list of regions of the continents within which the data centers are deployed, a list of data centers in each region, a list of building in each data center and/or associated T3 switches or routers, a list of racks within each building and/or associated T3 switches, a list of hosts in each rack and/or associated Tor switches, etc.

For example, as described, where failure detecting component 116 detects possible failure in multiple network nodes, and determines, based on the configuration, that the multiple network nodes are associated with the same higher-level network node, failure detecting component 116 can detect a possible issue with the higher-level network node. For example, failure detecting component 116 can detect a possible issue with the higher-level network node where all network nodes or a threshold portion of network nodes associated in the configuration with the higher-level network node have the same or similar possible failure detected.

In method 200, at action 214, the possible failure of the network node or a higher-level network node can be reported. In an example, reporting component 112, e.g., in conjunction with processor 102, memory 104, operating system 106, etc., can report the possible failure of the network node or the higher-level network node. For example, reporting component 112 can report the possible failure of the network node or the higher-level network node to another device 136 with an ICM component 138, where the report may include an identifier and/or location information of the network node or higher-layer network node.

For example, where the possible issue is with the network node, such as a server 132, the report can also include the throughput metrics used to determine possible failure. For example, where the possible issue is with the higher-level network node, the report may include throughput metrics of one or more lower network nodes used to determine the possible failure. The ICM component 138 can report the possible failure or a related notification to a network administrator or to an automated failure repair mechanism that can replace or activate redundant network nodes to mitigate decrease in throughput caused by the possible failure.

In one specific example, the data throughput used to detect possible failure of the network node can include MUX/DeMUX logic at a switch, such as Tor switch(es) 130, switch(es) 126, switch(es) 122, etc. In an example, throughput measuring component 112 can measure the throughput at the MUX/DeMUX logic of the switch to detect possible failure of the switch. As described, for example, this can include comparing the average historical throughput over a time period at the MUX/DeMUX logic to a measured value to detect whether a deviation indicates possible failure. In addition, in an example, throughput measuring component 112 may determine to measure and compare throughput at the MUX/DeMUX logic where possible failure is determined at the switch based on deviation in throughput at multiple network nodes for which the switch provides network connectivity.

In another example, deviation in throughput may be caused by other events that are not possible failure. For example, deviation in throughput may be caused by resource allocation at the network node, such as for additional service provisioning, addition or removal of VMs, etc. In other words, a change in the available resources associated with the current time period may explain why a deviation associated with a possible failure may be detected relative to prior metrics for prior time periods.

Consequently, in some aspects, in detecting the possible issue at action 204, optionally at action 216, it can be determined whether a resource allocation at the network node is modified during the time period. In an example, failure detecting component 114, e.g., in conjunction with processor 102, memory 104, operating system 106, etc., can determine whether the resource allocation at the network node is modified during the time period. For example, failure detecting component 114 can determine change in resource allocation based on occurrence of other events, to which failure detecting component 114 can subscribe to receive from the network nodes or otherwise obtain from database 134 or another data store where the network nodes (e.g., server(s) 132) can log events that result in resource allocation change, such as additional service provisioning, addition or removal of VMs, etc.

In addition, for example, the change in resource allocation can be associated with a timestamp, which failure detecting component 114 can use to determine whether resource allocation is changed in the time period during which the possible failure is detected (e.g., at a time during the time period related to throughput monitoring).

Where failure detecting component 114 determines that the resource allocation has changed, for example, failure detecting component 114 may not detect the possible failure (or may adjust deviation thresholds for detecting possible failure). In other words, at action 216, if a resource allocation and/or some other resource-related event is detected during the time period (e.g., "yes"), then in some cases the method 200 may return to the monitoring at action 202 based on such a determination. Alternatively, at action 216, if a resource allocation and/or some other resource-related event is not detected during the time period (e.g., "no"), then the method 200 may proceed to action 214 and report the possible failure.

Optionally, at action 217, based on determining a resource allocation has occurred (e.g., "yes" at action 216), the method 200 may further evaluate whether the change in resource allocation corresponds to the deviation associated with a possible failure in the time period. In other words, for example, based on a resource allocation change, throughput measuring component 114 can recompute averages for the throughput metrics based on the resource allocation change to facilitate detecting possible failure with the new allocation of resources. For instance, based on the recomputed metrics, throughput measuring component 114 can determine whether the deviation in the time period corresponds to the change in network resources. For example, (e.g., if resources are deallocated, then the deviation in throughput may be correlated to the reduction in available resources). If a correspondence is determined (e.g., "yes" at 217), then the method 200 may return to the monitoring at action 202. If a correspondence is not determined (e.g., "no" at 217), then the method 200 may proceed to action 214 and report the possible failure. In other words, reporting the possible failure of the network node is further based on a determination that a modified resource allocation at the network node during the time period does not correspond to the possible failure.

For example, the resource allocation change may include provisioning a new VM with one or more components, such as a database, platform as a service (PAAS), infrastructure as a service (IAAS), allocating a VM service as an edge gateway, etc. In an example, monitoring component 110 can access, for a particular node, an application programming interface (API), that can notify of events on the node, such as the allocation or deallocation of resources on a particular VM or provisioning of a new VM, etc. Accordingly, for example, throughput measuring component 114 can determine to recompute averages based on such events for a node and/or failure detecting component 116 can determine that a possible failure did not necessarily occur based on such events and may not log or notify of the possible failure, etc.

In method 200, optionally at action 218, a user interface indicating the possible failure of the network node or the higher-level network node can be displayed. In an example, reporting component 112, e.g., in conjunction with processor 102, memory 104, operating system 106, etc., which can be on the device 100 or another device to which the possible failure(s) can be reported, can display the user interface indicating the possible failure of the network node or the higher-level network node. For example, reporting component 112 can provide the user interface as a gesture based dashboard that can portray the connectivity and/or health status of data centers in multiple continents or regions. For example, the dashboard can allow for zoom clicking from continent to regions in the continent, to countries in the region, to cities/locations in the country, to building clusters in the city/location, to buildings in the building cluster, to rooms in the building, to racks in the room, to switches, hosts (e.g., servers), VMs, etc. in the rack. The user interface can use color variation to indicate the possible failure, where the color can be propagated from the network node or higher-level network node for which the possible failure is detected, up to each higher-level, so that a user using the interface can spot the possible failure color variation and zoom down to the network node at which the possible failure is detected. This can allow for more efficient failure detection by a user, such as a network administrator using the user interface.

In addition, for example, the monitoring component 110 can be configured to monitor substantially any network or computing platform by providing a network configuration to the monitoring component 110. For example, the monitoring component 110 can provide an interface or other mechanism to load a configuration of the network configuration of the multiple network nodes, where the configuration identifies a hierarchical configuration of network nodes along with identifying information (e.g., IP address, host name, etc.). For example, the configuration can be obtained at action 212, as described above. In this example, throughput measuring component 112 can begin measuring throughput metrics of the network nodes based on the obtained network configuration. For example, throughput measuring component 112 can obtain throughput information for the network nodes as indicated and identified in database 134. In another example, throughput measuring component 112 can register with the network nodes to service principal authorization (e.g., ACL authorization) on to the network nodes targeted for monitoring and can execute a shell command retrieve performance metrics, such as throughput, in real time, as described.

Figure 3:
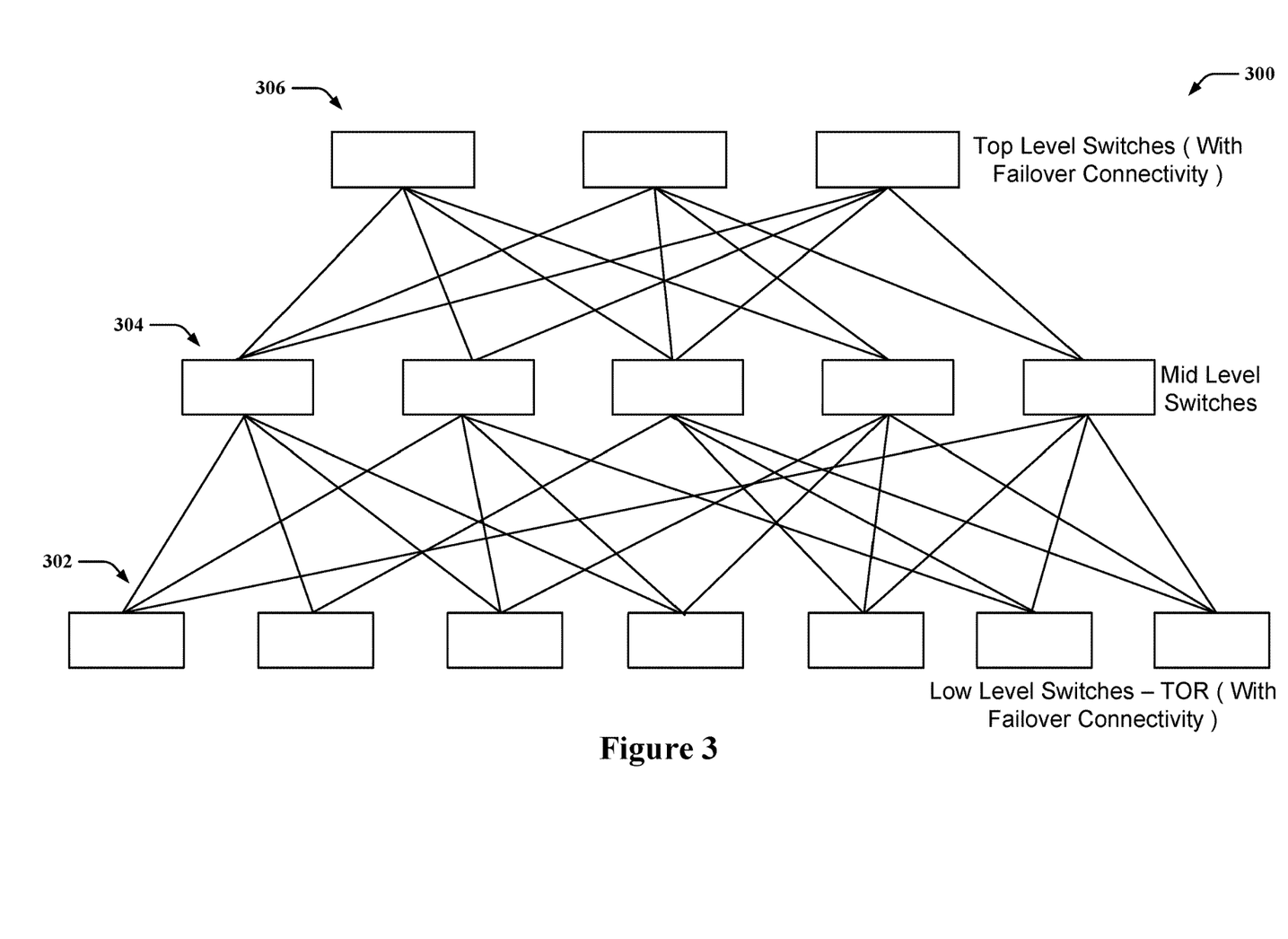
FIG. 3 illustrates an example of a portion of a cloud-based computing platform architecture, in accordance with aspects described herein.

FIG. 3 illustrates an example of at least a portion of a cloud-based computing platform architecture 300, which may be a mesh network including multiple nodes at multiple levels. For example, architecture 300 may include, or may be, or may be part of, an architecture of a cloud-based computing platform 120 described in reference to FIG. 1 above. Architecture 300 can include multiple Tor switches 302, which may include Tor switches 130. The Tor switches 302 may be low level network switches with failover connectivity, such that when one low level switch fails, another low level switch can be initialized in its place. Architecture 300 can also include another layer (or multiple layers) of midlevel switches 304, which may include switches 126. Architecture 300 can also include top level switches, which may include switch(es) 122. The top level switches 306 may also include failover connectivity, such that when one top level switch fails, another top level switch can be initialized in its place. In an example, the various levels of switches can be provided in a single geographic location or across geographic locations.

In one example, top level switches 306 can each be at different geographic locations and can connect to the midlevel switches 304 and low level switches 302 in the respective geographic location. A property of the mesh network architecture 300 may also include connection (e.g., physical or virtual, and/or direct or spanning multiple other connections) between each top level switch 306 and each midlevel switch 304, and between each midlevel switch 304 and each low level switch 302, and so on for a number of levels (as illustrated by the solid lines connecting the switches). This mesh network architecture can allow for providing the failover connectivity, such that when failure is detected for one switch (e.g., a possible failure as described above based on detecting a variance in throughput metric), another switch can be used in its place with the same connectivity to the same lower level switches or other nodes.

Figure 4:
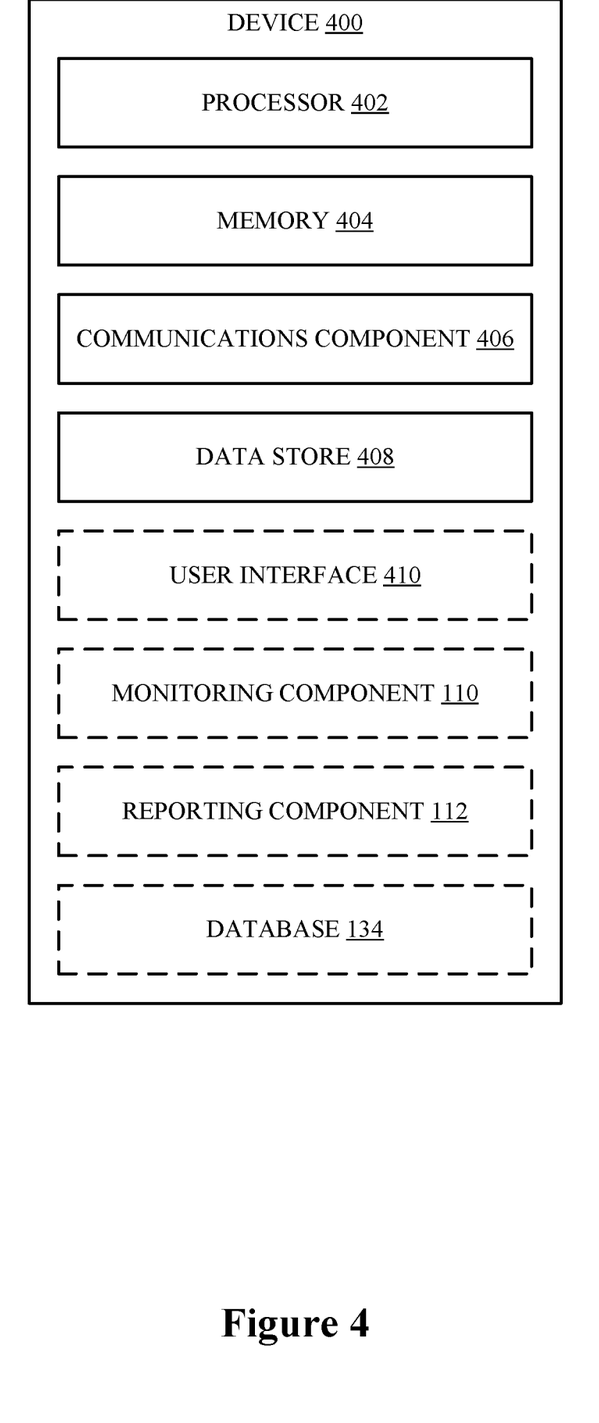
FIG. 4 is a schematic diagram of an example of a device for performing functions described herein, in accordance with aspects described herein.

FIG. 4 illustrates an example of device 400 including additional optional component details as those shown in FIG. 1. In one aspect, device 400 may include processor 402, which may be similar to processor 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 104 such as for storing local versions of operating systems (or components thereof) and/or applications being executed by processor 402, such as a monitoring component 110, reporting component 112, database 134, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc. utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc.) not currently being executed by processor 402. In addition, data store 408 may be a data repository for monitoring component 110, reporting component 112, database 134, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The following aspects are illustrative only and aspects thereof may be combined with aspects of other embodiments or teaching described herein, without limitation.

Aspect 1 is a computer-implemented method for detecting possible failure in network nodes, comprising: monitoring, by a monitoring application, a data throughput for at least one of data sent or received at a network node over a time period; detecting a possible failure of the network node based on comparing the data throughput to an average data throughput for the network node measured over one or more historical time periods of a similar duration as the time period; and reporting the possible failure of the network node.

In Aspect 2, the computer-implemented method of Aspect 1, further comprising: monitoring, by the monitoring application, additional data throughputs for one or more additional network nodes over the time period; detecting an additional possible failure of the one or more additional network nodes based on comparing the additional data throughputs to additional average data throughputs for the one or more additional network nodes measured over the one or more historical time periods of the similar duration as the time period; detecting, based on detecting the possible failure and the additional possible failure, a higher-level possible failure of a higher-level network node that provides network connectivity for the network node and the one or more additional network nodes; and reporting the higher-level possible failure of the higher-level network node.

In Aspect 3, the computer-implemented method of any preceding Aspect, further comprising obtaining a configuration indicating the higher-level network node as an upstream node of the network node and the one or more additional network nodes in a network infrastructure, wherein detecting the higher-level possible failure is further based on the configuration.

In Aspect 4, the computer-implemented method of any preceding Aspect, wherein the higher-level network node is a switch that provides network connectivity for the network node and the one or more additional network nodes.

In Aspect 5, the computer-implemented method of any preceding Aspect, further comprising: detecting another higher-level possible failure of an additional switch; and detecting, based on detecting the higher-level possible failure and the another higher-level possible failure, a rack-level possible failure of network rack that provides network connectivity for the switch and the additional switch; and reporting the rack-level possible failure of the network rack.

In Aspect 6, the computer-implemented method of any preceding Aspect, further comprising monitoring, by the monitoring application, a multiplexing or demultiplexing metric at the switch over the time period, wherein detecting the higher-level possible failure is further based on the multiplexing or demultiplexing metric.

In Aspect 7, the computer-implemented method of any preceding Aspect, wherein detecting the possible failure is further based on determining whether a resource allocation of the network node is modified during the time period.

In Aspect 8, the computer-implemented method of any preceding Aspect, wherein the resource allocation corresponds to addition or removal of one or more virtual machines executing on the network node.

In Aspect 9, the computer-implemented method of any preceding Aspect, wherein reporting the possible failure of the network node is further based on a determination that a modified resource allocation at the network node during the time period does not correspond to the possible failure.

In Aspect 10, the computer-implemented method of any preceding Aspect, wherein monitoring the network node is based at least in part on at least one of obtaining the data throughput from the network node in real time or obtaining an indication of the data throughput as previously measured over the time period.

In Aspect 11, the computer-implemented method of any preceding Aspect, wherein reporting the possible failure includes reporting the possible failure to an intelligence contact management (ICM) system to facilitate notification or repair of the possible failure.

Additional Aspects include a device for detecting possible failure in network nodes, comprising: a memory storing instructions; and at least one processor coupled to the memory and configured to execute the instructions to perform any of the preceding method Aspects.

Other additional Aspects include a non-transitory computer-readable device storing instructions thereon that, when executed by at least one computing device, causes the at least one computing device to perform operations for detecting possible failure in network nodes, comprising performing any of the preceding method Aspects.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for detecting probable failure in network nodes, comprising:
   monitoring, by a monitoring application, a data throughput for at least one of data sent or received at a network node over a time period;
   receiving an indication of provisioning a new virtual machine (VM) on the network node;
   detecting a probable failure of the network node based on a deviation in data throughput at the network node detected based on comparing the data throughput to an average data throughput for the network node measured over one or more historical time periods of a similar duration as the time period, wherein detecting the probable failure is further based on determining, based on the indication, that the deviation does not correspond to provisioning of the new VM on the network node; and
   reporting the probable failure of the network node.

2. The computer-implemented method of claim 1, further comprising:
   monitoring, by the monitoring application, additional data throughputs for one or more additional network nodes over the time period;
   detecting an additional probable failure of the one or more additional network nodes based on comparing the additional data throughputs to additional average data throughputs for the one or more additional network nodes measured over the one or more historical time periods of the similar duration as the time period;
   detecting, based on detecting the probable failure and the additional probable failure, a higher-level probable failure of a higher-level network node that provides network connectivity for the network node and the one or more additional network nodes; and
   reporting the higher-level probable failure of the higher-level network node.

3. The computer-implemented method of claim 2, further comprising obtaining a configuration indicating the higher-level network node as an upstream node of the network node and the one or more additional network nodes in a network infrastructure, wherein detecting the higher-level probable failure is further based on the configuration.

4. The computer-implemented method of claim 2, wherein the higher-level network node is a switch that provides network connectivity for the network node and the one or more additional network nodes.

5. The computer-implemented method of claim 4, further comprising:
   detecting another higher-level probable failure of an additional switch;
   detecting, based on detecting the higher-level probable failure and the another higher-level probable failure, a rack-level probable failure of network rack that provides network connectivity for the switch and the additional switch; and
   reporting the rack-level probable failure of the network rack.

6. The computer-implemented method of claim 4, further comprising monitoring, by the monitoring application, a second throughput at a multiplexing or demultiplexing logic at the switch over the time period, wherein detecting the higher-level probable failure is further based on the second throughput.

7. The computer-implemented method of claim 1, wherein detecting the probable failure is further based on determining whether a resource allocation of the network node is modified during the time period.

8. The computer-implemented method of claim 7, wherein the resource allocation corresponds to addition or removal of one or more virtual machines executing on the network node.

9. The computer-implemented method of claim 7, wherein reporting the probable failure of the network node is further based on a determination that a modified resource allocation at the network node during the time period does not correspond to the probable failure.

10. The computer-implemented method of claim 1, wherein monitoring the network node is based at least in part on at least one of obtaining the data throughput from the network node in real time or obtaining an indication of the data throughput as previously measured over the time period.

11. The computer-implemented method of claim 1, wherein reporting the probable failure includes reporting the probable failure to an intelligence contact management (ICM) system to facilitate notification or repair of the probable failure.

12. A device for detecting possible failure in network nodes, comprising:
   a memory storing instructions; and
   at least one processor coupled to the memory and configured to execute the instructions to:
   monitor, by a monitoring application, a data throughput for at least one of data sent or received at a network node over a time period;
   receive an indication of provisioning a new virtual machine (VM) on the network node;
   detect a probable failure of the network node based on a deviation in data throughput at the network node detected based on comparing the data throughput to an average data throughput for the network node measured over one or more historical time periods of a similar duration as the time period, wherein detecting the probable failure is further based on determining, based on the indication, that the deviation does not correspond to provisioning of the new VM on the network node; and
   report the probable failure of the network node.

13. The device of claim 12, wherein the at least one processor is configured to execute the instructions to:
   monitor, by the monitoring application, additional data throughputs for one or more additional network nodes over the time period;
   detect an additional probable failure of the one or more additional network nodes based on comparing the additional data throughputs to additional average data throughputs for the one or more additional network nodes measured over the one or more historical time periods of the similar duration as the time period;
   detect, based on detecting the probable failure and the additional probable failure, a higher-level probable failure of a higher-level network node that provides network connectivity for the network node and the one or more additional network nodes; and
   report the higher-level probable failure of the higher-level network node.

14. The device of claim 13, wherein the at least one processor is configured to execute the instructions to obtain a configuration indicating the higher-level network node as an upstream node of the network node and the one or more additional network nodes in a network infrastructure, wherein the at least one processor is configured to execute the instructions to detect the higher-level probable failure further based on the configuration.

15. The device of claim 13, wherein the higher-level network node is a switch that provides network connectivity for the network node and the one or more additional network nodes.

16. The device of claim 15, wherein the at least one processor is configured to execute the instructions to:
detect another higher-level probable failure of an additional switch;
detect, based on detecting the higher-level probable failure and the another higher-level probable failure, a rack-level probable failure of network rack that provides network connectivity for the switch and the additional switch; and
report the rack-level probable failure of the network rack.

17. The device of claim 15, wherein the at least one processor is configured to execute the instructions to monitor, by the monitoring application, a second throughput at a multiplexing or demultiplexing logic at the switch over the time period, wherein the at least one processor is configured to execute the instructions to detect the higher-level probable failure further based on the second throughput.

18. The device of claim 12, wherein the at least one processor is configured to execute the instructions to detect the probable failure further based on determining whether a resource allocation of the network node is modified during the time period.

19. The device of claim 18, wherein the resource allocation corresponds to addition or removal of one or more virtual machines executing on the network node.

20. The device of claim 18, wherein to report the probable failure of the network node is further based on the at least one processor being further configured to execute the instructions to determine that a modified resource allocation at the network node during the time period does not correspond to the probable failure.

21. The device of claim 12, wherein to monitor the network node is based at least in part on the at least one processor being further configured to execute the instructions to at least one of obtain the data throughput from the network node in real time or obtain an indication of the data throughput as previously measured over the time period.

22. The device of claim 12, wherein to report the probable failure the at least one processor is further configured to execute the instructions to report the probable failure to an intelligence contact management (ICM) system to facilitate notification or repair of the probable failure.

23. A non-transitory computer-readable device storing instructions thereon that, when executed by at least one computing device, causes the at least one computing device to perform operations for detecting possible failure in network nodes, comprising:
monitoring, by a monitoring application, a data throughput for at least one of data sent or received at a network node over a time period;
receiving an indication of provisioning a new virtual machine (VM) on the network node;
detecting a probable failure of the network node based on a deviation in data throughput at the network node detected based on comparing the data throughput to an average data throughput for the network node measured over one or more historical time periods of a similar duration as the time period, wherein detecting the probable failure is further based on determining, based on the indication, that the deviation does not correspond to provisioning of the new VM on the network node; and
reporting the probable failure of the network node.

24. The non-transitory computer-readable device of claim 23, wherein the operations further include:
monitoring, by the monitoring application, additional data throughputs for one or more additional network nodes over the time period;
detecting an additional probable failure of the one or more additional network nodes based on comparing the additional data throughputs to additional average data throughputs for the one or more additional network nodes measured over the one or more historical time periods of the similar duration as the time period;
detecting, based on detecting the probable failure and the additional probable failure, a higher-level probable failure of a higher-level network node that provides network connectivity for the network node and the one or more additional network nodes; and
reporting the higher-level probable failure of the higher-level network node.

* * * * *